H. C. WAITE.
AGRICULTURAL SOIL WORKING MACHINE.
APPLICATION FILED JAN. 31, 1914.
1,120,255.
Patented Dec. 8, 1914.
3 SHEETS—SHEET 1.
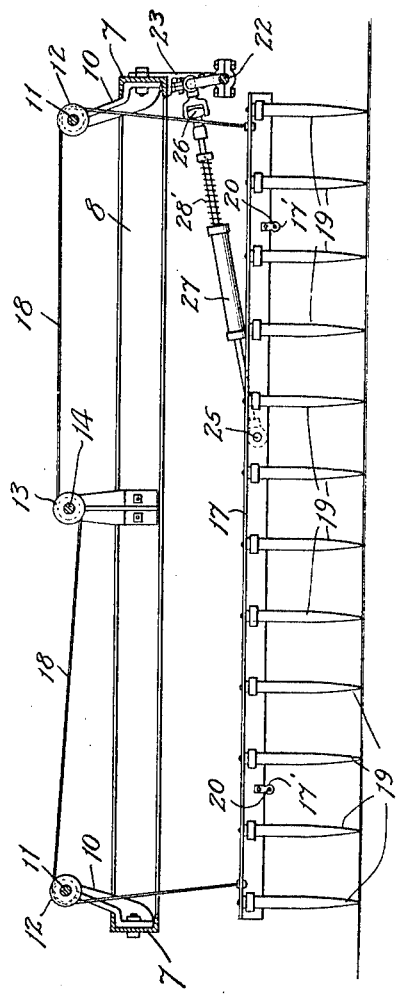
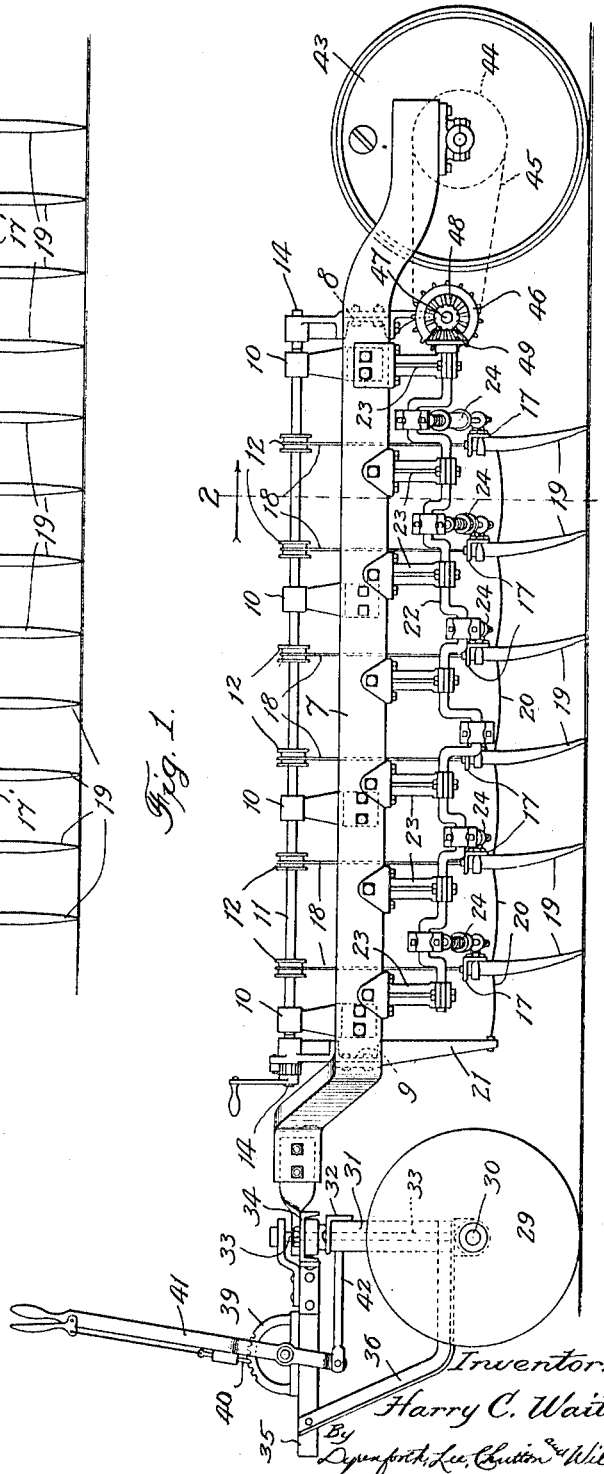
Inventor:
Harry C. Waite,

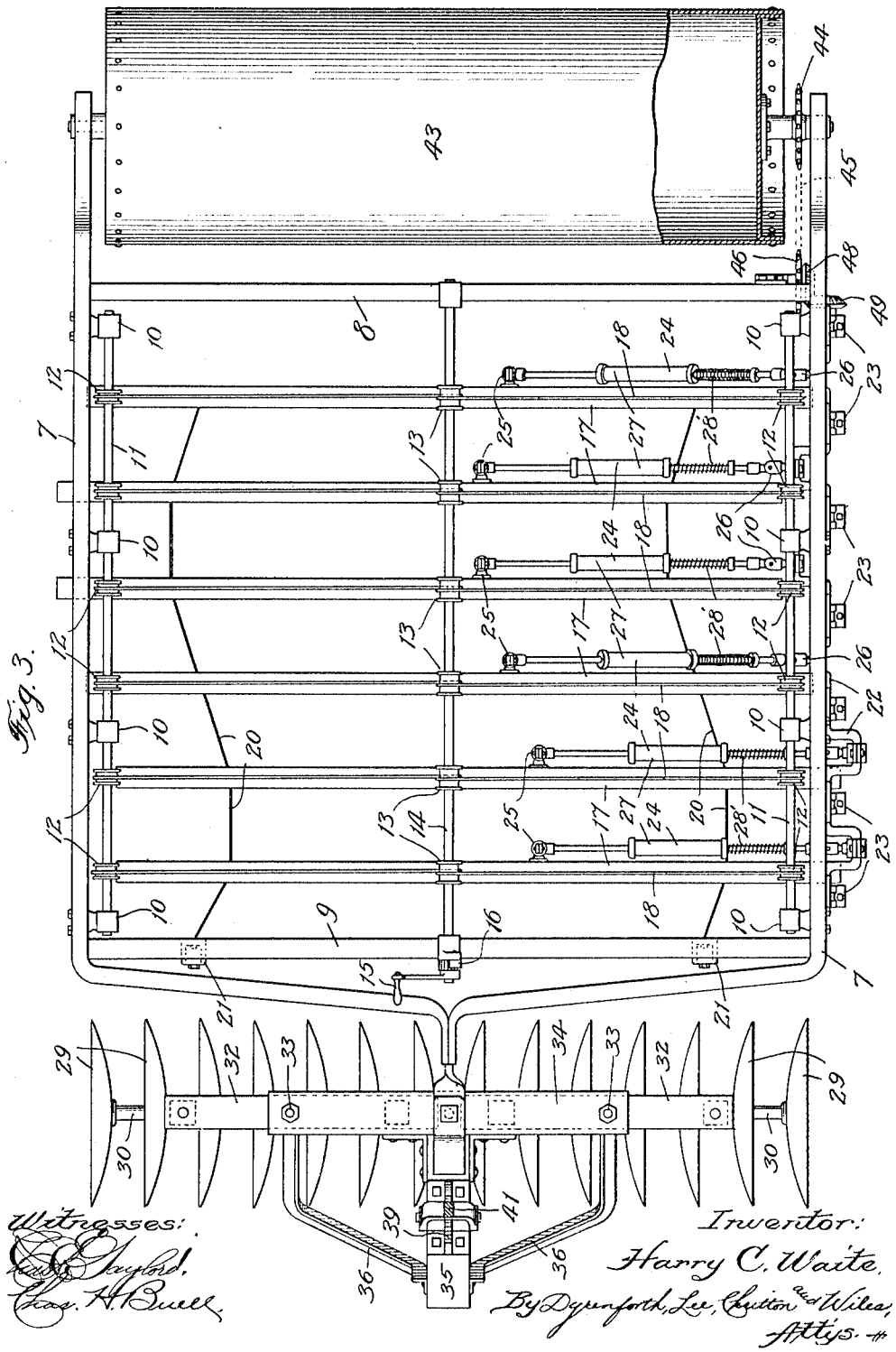

H. C. WAITE.
AGRICULTURAL SOIL WORKING MACHINE.
APPLICATION FILED JAN. 31, 1914.
1,120,255.
Patented Dec. 8, 1914.
3 SHEETS—SHEET 3.
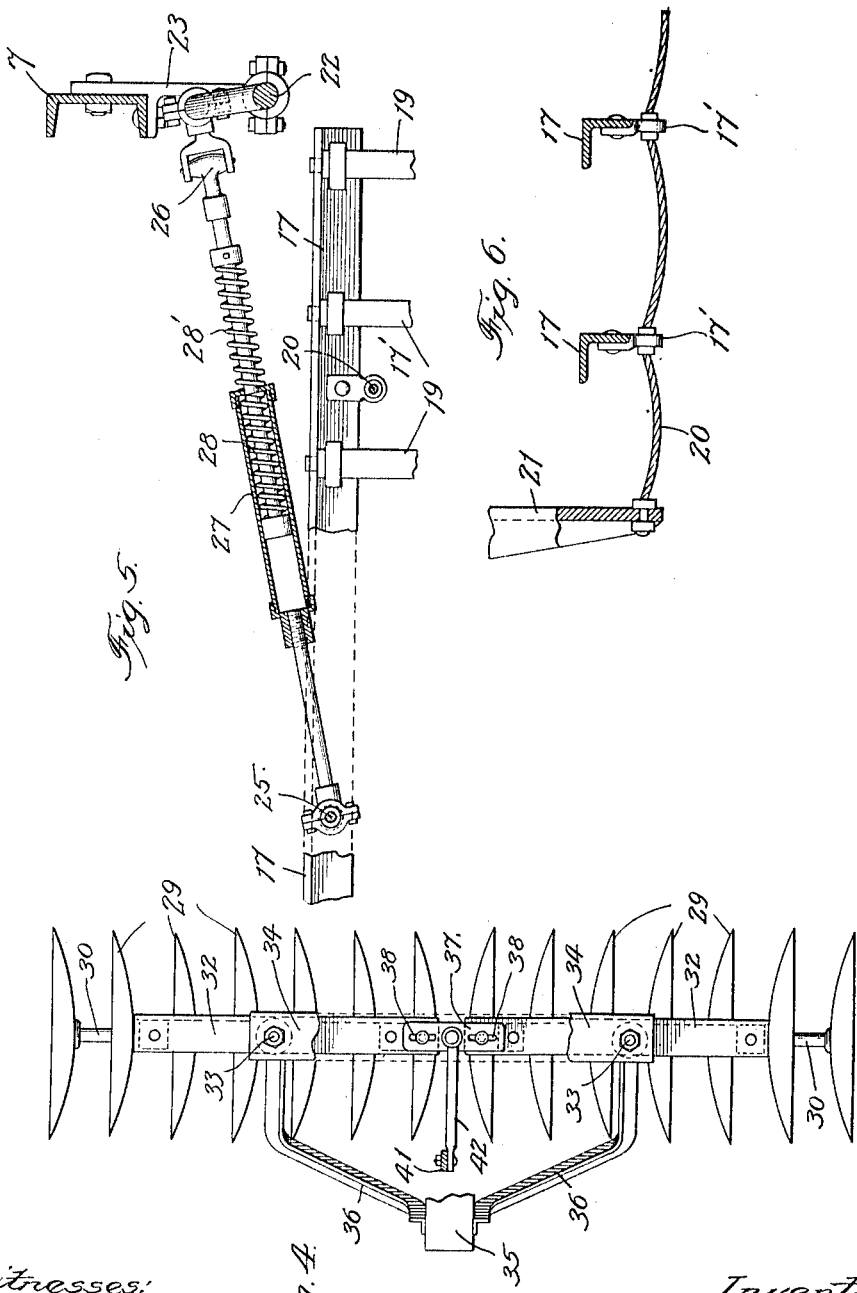

UNITED STATES PATENT OFFICE.

HARRY C. WAITE, OF LEWISTOWN, MONTANA.

AGRICULTURAL SOIL-WORKING MACHINE.

1,120,255.  Specification of Letters Patent.  Patented Dec. 8, 1914.

Application filed January 31, 1914. Serial No. 815,740.

*To all whom it may concern:*

Be it known that I, HARRY C. WAITE, a citizen of the United States, residing at Lewistown, in the county of Fergus and State of Montana, have invented a new and useful Improvement in Agricultural Soil-Working Machines, of which the following is a specification.

The object of my invention is to provide an agricultural machine to operate, by moving on the land, to thoroughly disintegrate or "pulverize" the soil.

My invention is illustrated, in its preferred embodiment, in the accompanying drawings, in which—

Figure 1 is a view of the machine in side elevation; Fig. 2 is a section on line 2, Fig. 1; Fig. 3 is a plan view of the machine, with a portion of the roller broken away; Fig. 4 is a broken plan view, partly sectional, of the disk horrow forming the front end of the machine; Fig. 5 is an enlarged broken view in sectional elevation illustrating the flexible link connection between the crank-shaft and a tooth-carrying bar, as shown in Fig. 2, and Fig. 6 is an enlarged broken view in sectional elevation showing the preferred manner of connecting the flexibly-suspended toothed-bars by a cable.

The principal feature of my machine is the so-called pulverizer for working the soil to disintegrate it; and its preferred construction, in the matter of details, is that illustrated and described as follows:

The parts are supported on a frame 7 of general rectangular shape, which may be best constructed of channel-bars. Rails 8 and 9 extending, respectively, across the rear and front ends of the frame have alining bearings rising centrally from them for the ends of a rotary shaft 14. In bearings 10 extending inwardly from each side-rail of the frame, are journaled rotary shafts 11, 11, carrying sheaves 12 to aline, transversely of the frame, with sheaves 13 on the central shaft 14, which carries on its forward end a handle 15 and is there provided with a pawl-and-ratchet device 16. On each transverse set of the sheaves 12, 13 is suspended an angle-bar 17 by cables 18 attached to it near its opposite ends, passing thence over the opposite sheaves 12 and being fastened at the inner ends to the sheave 13 to adapt them to be wound or unwound thereon in respectively opposite directions for raising and lowering the suspended bar. Six of these bars are shown, and each carries a plurality of depending teeth 19, uniformly spaced apart. The flexibly-suspended teeth are for penetrating and stirring the soil to pulverize it, the depth of their penetration being regulated by turning the shaft 14 to let out or wind thereon the cables 18. These bars 17 are tied together in their spaced relation lengthwise of the frame, at clips 17' thereon (Fig. 6), by cables 20 extending from posts 21 depending from the rail 9 near its ends, and connected at their rear ends with the clips on the hindermost bar 17.

For stirring the soil by moving the frame 7 over it, the teeth 19 are vibrated in the soil by reciprocating the bars 17. This action is produced by a crank-shaft 22 journaled in bearings 23 depending from a side-rail of the frame and having the cranks, one for each bar 17, extending at different angles and connected with respective bars through the medium of divided flexible links 24. Each link has its inner section pivotally fastened, as at 25, to a different bar, and has a universal-joint 26 in its outer section, which is connected with a crank of the shaft 22; and the link contains an intermediate thrust-taking section composed of a tubular housing 27 forming a continuation of its inner section and on which works the outer link-section having confined about it in the housing a spiral spring 28 and outside of the same, against the end of the housing, a similar spring 28'.

Harrow-disks 29 are attached to the forward end of the frame 7, centrally thereof. The disks are shown to be supported, in sets, on two alining shafts 30, 30 journaled in the depending arms 31 of generally U-shaped frames having their alining horizontal arms 32 each pivotally connected at 33 with a relatively-wide channel-bar 34 surmounting them. The two sets of disks 29 are thus flexibly connected together to adapt them to be swung to various angles on their pivots. A tongue 35 is rigidly connected with the bar 34 centrally between the frame-arms 32 and serves for connecting the machine with a suitable motive power, which may be a tractor-engine; and it is shown to be connected by yoke-arms 36 with the pivot-rods 33. A plate 37 (Fig. 4) containing slots 38, bridges, underneath the bar 34, the space between the adjacent ends of the frame-arms 32, and is bolted to the latter through its slots. On the tongue is supported a segmental rack 39 for coöperation therewith of a spring pawl 40 on an operating lever 41 fulcrumed between its ends on the rack and having its lower end connected by a link-rod 42 with the plate 37, at its center. By manipulating the lever, the U-shaped frames may be adjusted to extend the shafts 30 and harrow-disks to different desired angles relative to the front end of the pulverizing machine. This is, generally-speaking, a common form of adjustment for harrows, however, and the construction is not claimed herein as a feature of my present invention.

The frame 7 is carried at its rear end on the axis of a roller 43, shown in the form of a hollow cylinder to contain a weighting medium, such as sand or, and preferably, water, with which it is adapted to be filled for loading the roller to any desired extent for its soil-rolling purpose. The roller carries on one end of its axis a sprocket 44, which is connected by a chain 45 with a sprocket 46 on a stub-shaft 47 journaled in bearings depending from the frame 7 and carrying a miter-gear 48 to mesh with a similar gear 49 on the adjacent end of the crank-shaft.

In the travel of the machine over land to be worked, the disks 29 harrow the soil, the teeth 19 thereupon pulverize it, and the roller 43 finally rolls it. The accompanying rotation of the crank-shaft vibrates the bars 17 thereby actuating the teeth thereon crosswise of the path of movement of the frame to stir the soil penetrated by them; and this stirring action is enhanced by the swirling motion imparted to the bars and their depending teeth by reason of the flexible suspension of the bars, whereby the soil is thoroughly disintegrated or pulverized.

The sets of teeth 19 are, as will be observed, independent of each other, so that any tooth or teeth in a set may ride over obstructions without straining the machine or affecting any other tooth; and by the set of the cranks at different angles, the resultant different working of the successive sets of the teeth still further enhances their pulverizing action.

I realize that considerable variation is possible in the details of construction thus specifically shown and described, and I do not intend by illustrating a single, specific or preferred embodiment of my invention to be limited thereto; my intention being in the appended claims to claim protection upon all the novelty there may be in my invention as broadly as the state of the art will permit.

What I claim as new and desire to secure by Letters Patent is—

1. A soil-disintegrating agricultural machine comprising a frame, a bar flexibly suspended on the frame to extend crosswise thereof and carrying pendent teeth to penetrate the soil, a crank-shaft connected with said bar, means for driving the crank-shaft, and resilient connecting means between said bar and crank-shaft having a yielding connection with the crank-shaft.

2. A soil-disintegrating agricultural machine comprising a frame, a bar flexibly suspended on the frame to extend crosswise thereof and carrying pendent teeth to penetrate the soil, a crank-shaft, a link pivotally connected at one end with the bar and having a universal-joint connection at its opposite end with the crank-shaft and an intermediate spring-pressed yielding section, and means for driving the crank-shaft.

3. A soil-disintegrating agricultural machine comprising, in combination, a frame, a series of bars flexibly suspended on the frame to extend crosswise thereof, teeth depending from the bars to penetrate the soil, a crank-shaft with cranks extending at different angles, yielding connections between the cranks and bars, and means for driving the crank-shaft.

4. A soil-disintegrating agricultural machine comprising, in combination, a frame, flexible suspending means depending at intervals along the frame near each side and connected together and to the frame lengthwise thereof, bars extending transversely of the frame and secured to said suspending means, teeth depending from the bars to penetrate the soil, a crank-shaft having its cranks connected with the bars, and means for driving the crank-shaft.

5. A soil-disintegrating agricultural machine comprising, in combination, a frame, shafts on the frame to extend lengthwise thereof and carrying sheaves at intervals, cables suspended on the sheaves and flexibly secured together in their spaced relation, bars suspended on the cables to extend transversely of the frame, teeth depending from the bars to penetrate the soil, a crank-shaft journaled on the frame and having its cranks connected with said bars, and means for driving the crank-shaft.

HARRY C. WAITE.

In presence of—
NELLIE B. DEARBORN,
DAISEY C. THORSEN.